United States Patent
Wang et al.

(10) Patent No.: US 11,620,261 B2
(45) Date of Patent: Apr. 4, 2023

(54) WRITING DATA TO AN LSM TREE FILE STRUCTURE USING CONSISTENT CACHE STAGING

(71) Applicant: VMware, Inc., Palo Alto, CA (US)

(72) Inventors: Wenguang Wang, Santa Clara, CA (US); Richard P. Spillane, Palo Alto, CA (US); Junlong Gao, Mountain View, CA (US); Robert T. Johnson, Palo Alto, CA (US); Christos Karamanolis, Los Gatos, CA (US); Maxime Austruy, Lausanne (CH)

(73) Assignee: VMware, Inc., Palo Alto, CA (US)

( * ) Notice: Subject to any disclaimer, the term of this patent is extended or adjusted under 35 U.S.C. 154(b) by 620 days.

(21) Appl. No.: 16/213,815

(22) Filed: Dec. 7, 2018

(65) Prior Publication Data

US 2020/0183886 A1 Jun. 11, 2020

(51) Int. Cl.
*G06F 16/172* (2019.01)
*G06F 12/0891* (2016.01)
(Continued)

(52) U.S. Cl.
CPC ........ *G06F 16/172* (2019.01); *G06F 12/0891* (2013.01); *G06F 16/1744* (2019.01); *G06F 16/9027* (2019.01)

(58) Field of Classification Search
CPC .............. G06F 16/172; G06F 12/0891; G06F 16/1744; G06F 16/9027; G06F 2212/452; G06F 2212/463; G06F 12/0875
See application file for complete search history.

(56) References Cited

U.S. PATENT DOCUMENTS

2014/0188870 A1* 7/2014 Borthakur ............... G06F 16/23
  707/736
2015/0143063 A1* 5/2015 Mutalik ............. G06F 11/1451
  711/162

(Continued)

OTHER PUBLICATIONS

O'Neil, et al., "The Log-Structured Merge-Tree (LSM-tree), Accessed Dec. 19, 2018, https://www.cs.umb.edu/ "poneil/lsmtree.pdf, 32 pages. IDS Document NPL Cite No. 16 (Year: 1996).*

(Continued)

*Primary Examiner* — Mark D Featherstone
*Assistant Examiner* — Samuel C Sharpless, III
(74) *Attorney, Agent, or Firm* — Barta, Jones & Foley, PLLC

(57) ABSTRACT

The disclosure herein describes writing data to a log-structured merge (LSM) tree file system on an object storage platform. Write data instructions indicating data for writing to the LSM tree file system are received. Based on the received instructions, the data is written to the first data cache. Based on an instruction to transfer data in the live data cache to the LSM tree file system, the first data cache is converted to a stable cache. A second data cache configured as a live data cache is then generated based on cloning the first data cache. The data in the first data cache is then written to the LSM tree file system. Use of a stable cache and a cloned live data cache enables parallel writing data to the file system by the stable cache and handling write data instructions by the live data cache.

20 Claims, 5 Drawing Sheets

(51) Int. Cl.
*G06F 16/901* (2019.01)
*G06F 16/174* (2019.01)

(56) References Cited

U.S. PATENT DOCUMENTS

| | | | | |
|---|---|---|---|---|
| 2016/0378653 | A1* | 12/2016 | Lu | G06F 12/0804 711/143 |
| 2017/0249257 | A1* | 8/2017 | Bonnet | G06F 12/0804 |
| 2017/0270041 | A1* | 9/2017 | Talagala | G06F 12/08 |
| 2017/0272100 | A1* | 9/2017 | Yanovsky | G06F 3/0619 |
| 2020/0117728 | A1* | 4/2020 | Tomlinson | G06F 7/14 |

OTHER PUBLICATIONS

Fei Mei, Qiang Cao, Hong Jiang, and Lei Tian. 2017. LSM-tree Managed Storage for Large-Scale Key-Value Store. In Proceedings of SoCC '17, Santa Clara, CA, USA, Sep. 24-27, 2017, 15 pages. (Year: 2017).*
Unknown, "Amazon Elastic File System (EFS)," Amazon Web Services, Inc., Accessed Dec. 17, 2018, https://aws.amazon.com/efs/, 21 pages.
Unknown, "What Is Amazon S3?," Amazon Web Services, Inc., Accessed Dec. 17, 2018, https://docs.aws.amazon.com/AmazonS3/latest/dev/Welcome.html, 1 page.
Unknown, "Request Rate and Performance Guidelines," Amazon Web Services, Inc., Accessed Dec. 17, 2018, https://docs.aws.amazon.com/AmazonS3/latest/dev/request-rate-perf-considerations.html, 1 page.
Unknown, "Amazon EC2," Amazon Web Services, Inc., Accessed Dec. 17, 2018, https://aws.amazon.com/ec2/?nc2=h_m1, 13 pages.
Unknown, "AWS Lambda," Amazon Web Services, Inc., Accessed Dec. 17, 2018, https://aws.amazon.com/lambda/?nc2=h_m1, 14 pages.
Unknown, "AWS Storage Gateway: File gateway for hybrid architectures overview and best practices," Amazon Web Services, Inc., Accessed Dec. 17, 2018, https://d1.awsstatic.com/whitepapers/aws-storage-gateway-file-gateway-for-hybrid-architectures.pdf, 18 pages.
Unknown, "AWS Storage Gateway Faqs," Amazon Web Services, Inc., Accessed Dec. 17, 2018, https://aws.amazon.com/storagegateway/faqs/, 27 pages.
Bender, et al., "Cache-Oblivious Streaming B-Trees," In Proceedings of the Nineteenth Annual ACM Symposium on Parallel Algorithms and Architectures, SPAA '07, Jun. 9-11, 2007, 12 pages.
Brodal, et al., "Lower Bounds for External Memory Dictionaries," Alcom-FT Technical Report Series, ALCOMFT-TR-03-75, Accessed Dec. 17, 2018, http://tildeweb.au.dk/au121/papers/alcomft-tr-03-75.pdf, 13 pages.
Chang, et al., "Bigtable: A Distributed Storage System for Structured Data," Google, Inc., Accessed Dec. 18, 2018, https://static.googleusercontent.com/media/research.google.com/en//archive/bigtable-osdi06.pdf, 14 pages.
Unknown, "Welcome to RocksDB," GitHub, Inc., Sep. 7, 2017, https://github.com/facebook/rocksdb/wiki/Open-Projects, 6 pages.
Unknown, "Storage Engine," DataStax, Inc., Oct. 17, 2018, http://docs.datastax.com/en/cassandra/2.1/cassandra/dml/dml_manage_ondisk_c.html, 1 page.
Unknown, "Google Cloud Storage Documentation," Google, Inc., Accessed Dec. 18, 2018, https://cloud.google.com/storage/docs/#, 2 pages.
Unknown, "How Do I Ensure Data Integrity of Objects Uploaded to or Downloaded from Amazon S3?," Amazon Web Services, Inc., Accessed Dec. 18, 2018, https://aws.amazon.com/premiumsupport/knowledge-center/data-integrity-s3/, 7 pages.
Unknown, "ObjectiveFS: A Shared Distributed Posix File System Backed by an Object Store," Amazon Web Services, Inc., Accessed Dec. 19, 2018, https://objectivefs.com, 7 pages.
O'Neil, et al., "The Log-Structured Merge-Tree (LSM-tree)," Accessed Dec. 19, 2018, https://www.cs.umb.edu/~poneil/lsmtree.pdf, 32 pages.
Palankar, et al., "Amazon s3 for Science Grids: A Viable Solution?," Accessed Dec. 21, 2018, http://citeseer.ist.psu.edu/viewdoc/download;jsessionid= 20ECF0F566448EB9ACED424A739F8CF9? doi=10.1.1.112.9646&rep=rep1&type=pdf, 1 page.
Raju, et al., "PebblesDB: Building Key-Value Stores Using Fragmented Logstructured Merge Trees," Accessed, Dec. 21, 2018, www.cs.utexas.edu/~vijay/papers/sosp17-pebblesdb.pdf, 18 pages.
Unknown, "s3fs: Fuse-Based File System Backed by Amazon s3," GitHub, Accessed Dec. 19, 2018, https://github.com/s3fs-fuse/s3fs-fuse, 4 pages.
Unknown, "SQLite4 LSM Users Guide," SQLite, Accessed Dec. 19, 2018, https://sqlite.org/src4/doc/trunk/www/lsmusr.wiki, 18 pages.
Unknown, "YAS3FS: Yet Another s3-backed File System," GitHub, Accessed Dec. 21, 2018, https://github.com/danilop/yas3fs, 11 pages.
Kougkas, et al., "Enosis: Bridging the Semamtic Gap Betweem File-Based and Object-Based Data Models", The International Conference for High Performance Computing, Networking, Storage and Analysis, Workshop: The Eighth International Workshop on Data-Intensive Computing in the Clouds, published 2017, 8 pages.

* cited by examiner

WRITING DATA TO AN LSM TREE FILE STRUCTURE USING CONSISTENT CACHE STAGING

BACKGROUND

Using the services of data storage platform providers has become essential for many companies, organizations, and other types of enterprise customers to obtain a cost-effective storage solution for their data. This requires a relatively inexpensive, scalable storage backend with a large capacity for the archival data while still allowing retrieval of historical data within a reasonable amount of time and overwriting of existing data. Object storage platforms (e.g., Amazon S3, etc.) are a low-cost storage solution, but current object storage platforms have several drawbacks. For example, overwriting on an object storage platform may cause huge write amplification if the platform does not support overwrite. As such, changes in one byte of a file results in re-writing the entire file. As another example, if there are many relatively small files, each of the files ends up with a small object on the platform, resulting in many requests to transfer objects on the platform, which is expensive. It is inefficient to directly use the object storage platform for data operations that may change small portions of large files.

Use of such object storage platforms may be combined with local caching of data changes (e.g., "dirty data") and batch updates to the object storage platform at defined times. However, staging dirty data from the cache onto the object storage platform can take a long time and may occupy the cache and other associated infrastructure components. As a result, users may experience periodic high latency during normal data workload and observe the system being unresponsive. Further, it is required that no changes are made to the data in the cache during staging to the object storage platform, which can further degrade the user experience. If data in the cache is mutated, the data staged could be a mix of unchanged and changed values throughout the staging process, which may result in corrupted or inconsistent data. Such inconsistencies may crash user applications or cause other issues when the associated data is used.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method and system for writing data to a log-structured merge (LSM) tree file system on an object storage platform is described. Write data instructions indicating data for writing to the LSM tree file system are received. Based on the received write data instructions, the data is written to the first data cache, which is configured as a live data cache. Based on an instruction to transfer data in the live data cache to the LSM tree file system, the first data cache is converted to a stable cache to which write data instructions are not directed. A second data cache is then generated based on cloning the first data cache, wherein the second data cache is configured as a live data cache to which write data instructions are directed. The data in the first data cache is then written to the LSM tree file system, whereby writing the data in the first data cache to the LSM tree file system is enabled to be performed in parallel with the second data cache receiving write data instructions.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 5, the systems are illustrated as schematic drawings. The drawings may not be to scale.

DETAILED DESCRIPTION

Aspects of the disclosure provide a computerized method and system for writing data to a log-structured merge (LSM) tree file system on an object storage platform. Data to be written to the LSM tree file system is initially cached locally in a live data cache on a client device. When the live data cache fills up to a defined amount, or a defined time interval has passed, the client device begins staging the cached data to the LSM tree file system. The initial cache is converted to a stable cache, or a cache snapshot, such that no further data changes are recorded in it. A second live data cache is generated as a clone of the stable cache. The second live data cache is configured to include the data of the stable cache and to cache any further data changes that occur after its generation. The data in the stable cache is staged and written to the LSM tree file system in parallel with any additional data change processing that is done using the second live data cache. Aspects of the disclosure stage data from the cache to the object storage platform in a consistent manner to enable a positive user experience.

The disclosure operates in an unconventional way at least by using parallel cloned caches to handle both the staging operations for writing data from a cache to the file system, and the further I/O operations that require changes to the cached data. The cloning techniques described herein, including the use of modified copy-on-write principles (e.g., redirect-on-write, etc.), provide an efficient method for enabling consistent data staging while reducing any lag time or similar negative effects on the user experience. The local cache system described herein provides a consistent view of data in the cache during staging by freezing the cache in a stable state, provides persistent storage of data changes in the local cache(s) through use of on-disk cache data structures, and prevents blocking of further I/O operations occurring concurrently with the staging process by providing a live data cache cloned from the stable cache as described, among other items.

Figure 1:
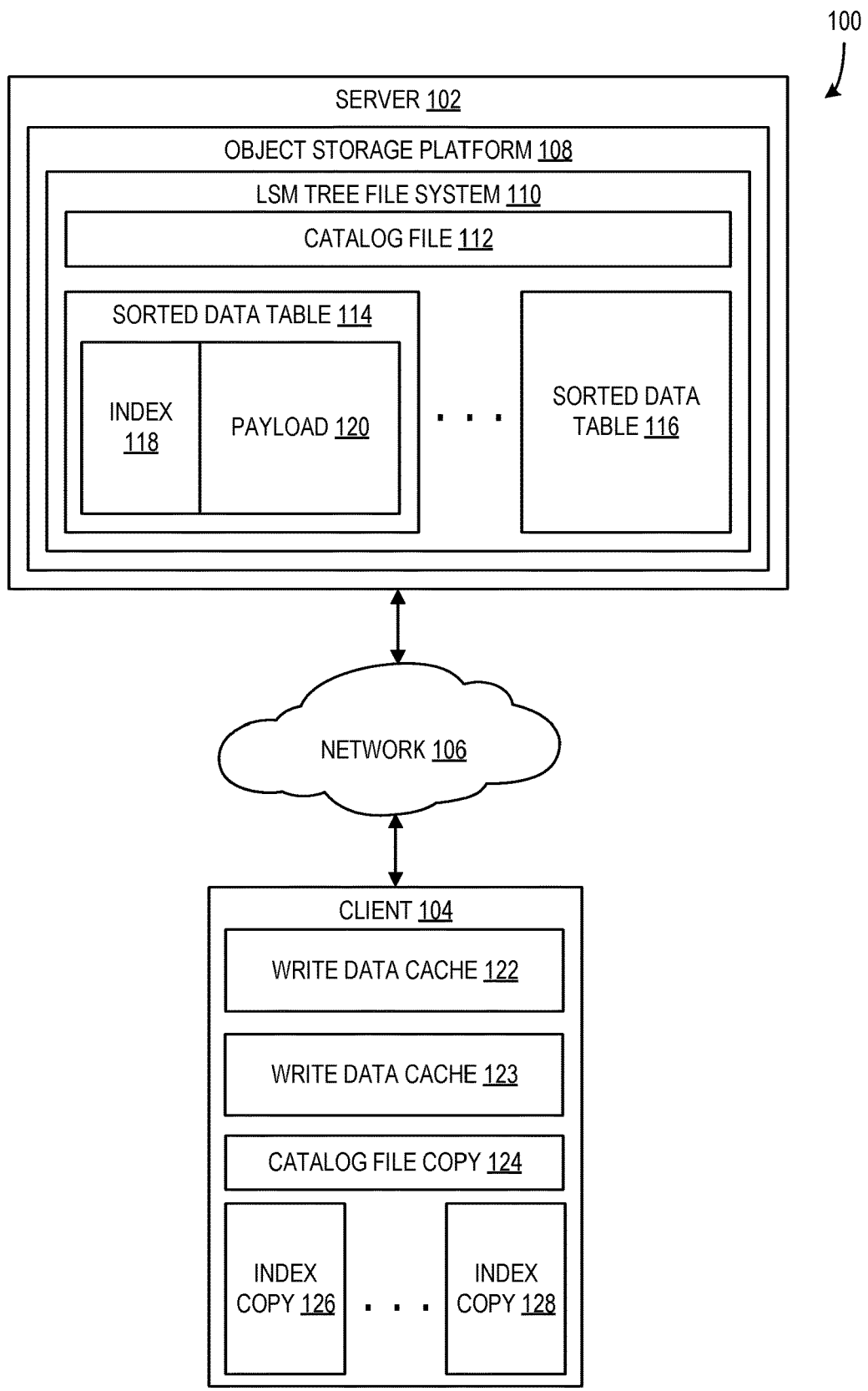
FIG. 1 is an exemplary block diagram illustrating a system configured for storing a providing access to data in on an object storage platform according to an embodiment.

FIG. 1 is an exemplary block diagram illustrating a system 100 configured for storing and providing access to data (e.g., payload 120 data, etc.) on an object storage platform 108 according to an embodiment. The system 100 includes a server 102 and a client 104 that are in communication via a network 106. The server includes an object storage platform 108 upon which an LSM tree file system 110 is implemented. In some examples, the server 102 and client 104 are computing devices that include hardware, firmware, and/or software configured to perform the operations described herein as well as other general computing operations. Alternatively, or additionally, the system 100 may include multiple server devices configured as the server 102 and including the object storage platform 108, such that the described data storage is distributed across the multiple server devices. Further, the system 100 may include multiple client devices configured to access the object storage platform 108 as described herein without departing from the description.

The network 106 includes one or more computer networks that are configured to enable network communications between the server 102 and the client 104. It should be understood that communications between components of the system 100 may be performed using network connections on the network 106 as would be understood by a person of ordinary skill in the art of computer networks and communications. The network 106 may include a plurality of networks (e.g., private intranets, public networks such as the Internet, etc.) and/or network types (e.g., wired networks, wireless networks such as Wi-Fi networks or cellular networks, etc.). The network 106 may include any hardware, firmware, and/or software arranged in hierarchies or structures that enable the components of the system 100 to communicate as described without departing from the description herein.

The object storage platform 108 is configured to operate according to object storage principles as would be understood by a person of ordinary skill in the art. The object storage platform 108 may be configured to abstract the storage of the associated data to be exposed and/or managed as objects, which may include the data itself, associated metadata, and/or a unique identifier of the particular object. In some examples, the object storage platform 108 is configured such that overwriting existing data and/or performing many small data writes is relatively expensive (e.g., the platform 108 may not support overwriting, such that changes to one byte of a file may result in the rewriting of the entire file, many small files may be stored as individual objects, resulting in many separate requests for object transfers and other operations, etc.).

The LSM tree file system 110 is implemented on the object storage platform 108, effectively transforming the object storage interface of the platform 108 into a block device interface where block offset values are used as keys of key-value tuples and block content is used as the values of the tuples. The LSM tree file system 110 includes a catalog file 112 and a plurality of sorted data tables 114-116. It should be understood that, while only two sorted data tables are illustrated, the file system 110 may include more, fewer, or different sorted data tables without departing from the description herein. Each sorted data table 114-116 includes an index 118 and a payload 120. It should be understood that the LSM tree file system 110 is configured to adhere to known LSM tree principles unless otherwise specified herein (e.g., the LSM tree file system 110 is optimized for "immutable write", such that edited data is not overwritten, but rather, replacement data is appended to unused space in the file system, etc.). In some examples, the catalog file 112 includes up-to-date metadata associated with all sorted data tables 114-116 of the file system 110, such that the catalog file 112 serves as a superblock for the entire file system 110. Such metadata may include unique identifiers of the tables 114-116 and other metadata used to identify locations of data (e.g., identify the sorted data table within which a particular set of data is stored, etc.) within the file system 110 as described herein.

In some examples, the LSM tree file system 110 exposes application program interfaces (APIs) for use by other entities, such as the client 104. For instance, the file system 110 may expose a "lookup" API that enables the client 104 to request data based on a provided key value or other location data (e.g., table identifier, offset values, address values, etc.) and an "update" API that enables the client 104 to write or otherwise record data to the file system 110. Such APIs may be configured to perform a portion of or all of the operations as described herein with respect to interacting with the data stored in the file system 110.

It should be understood that, while use of an LSM tree file system is primarily described, in other examples, other types of write optimized tree structures and/or techniques may be used (e.g., cache oblivious look-ahead arrays (COLA), BE-trees, fractal cascade trees, copy on write, etc.).

Further, in some examples, the object storage platform 108 and associated LSM tree file system 110 are configured to be used as a virtual disk by virtual machines or other software entities on the client 104 or other software entities associated with other devices.

Each of the sorted data tables 114-116 (e.g., Sorted String Tables, etc.) store data in the payload 120 and index 118 is configured to provide information about the specific locations of data in the payload 120. In some examples, the LSM tree file system 110 provides access to data in the form of data blocks of uniform size that are indexed by an offset location or address of each data block in the file system (e.g., each data block may be 4 KB in size and indexed by a numeric value that indicates a number of blocks that the data block is offset from the beginning of the file system, etc.). In such a configuration, the index 118 may contain keys that indicate an offset location of the associated data block within the file system and values mapped to the keys that indicate an offset location of the data block within the specific payload 120. Further, in some examples, catalog file 112 and the index 118 and payload 120 of each sorted data table 114-116 may be stored as separate objects with respect to the object storage platform 108.

It should be understood that, in some examples, the file system 110 may be configured to include bloom filters that enable the efficient determination of whether a particular data tuple is present in a given sorted data table. However, because the file system 110 includes a catalog file 112 and an index 118 for each sorted data table 114-116, the metadata contained therein may be used to identify the location of a particular data tuple as described herein without using a bloom filter in other examples.

The client 104 includes a write data cache 122, a write data cache 123, a catalog file copy 124, and a plurality of index copies 126-128. The write data cache 122 and write data cache 123 may be installed or otherwise stored on the client 104. The client 104 is configured to use the write data caches 122, 123 when writing data to the file system 110 and the catalog file copy 124 and index copies 126-128 when reading data from the file system 110. In some examples, the client 104 is configured to write data to the write data caches 122, 123 that is intended to be written to the LSM tree file system 110. In some examples, write data traffic of the client 104 is directed to write data cache 122 and/or 123, and changes to the caches are tracked as metadata. The write data cache 122 may be configured as a stable state cache (e.g., a cache snapshot, etc.) and cloned to create the write data cache 123 as a live data cache. Thereafter, data in the write data cache 122 may be written to the LSM tree file system 110 as described below with respect to FIGS. 2-4. Using a stable state cache (e.g., data cache 122) and a live write data cache (e.g., data cache 123) enables writing of data to the LSM tree file system 110 without interrupting the live data traffic of the client 104 and maintains the consistency of associated data changes. The configuration and use of the write data caches 122 and 123 are described in greater detail below with respect to FIG. 2.

The client 104 may be configured to only write data values that are new or are being changed to the write data cache 122, rather than, for instance, entire files that are largely the same but include some data values being changed. The write data caches 122 and/or 123 may have an associated capacity threshold and/or an expiration time interval (e.g., a "Recovery Point Objective" (RPO) interval representing a maximum targeted time period in which data might be lost due to a major incident, etc.). The client 104 may be configured to send the data in the write data caches 122 and/or 123 when the quantity of data in the caches 122 and/or 123 meets or exceeds the capacity threshold. Additionally, or alternatively, the client 104 may be configured to send the data in the write data caches 122 and/or 123 when the time passed since the last write to the server 102 meets or exceeds the expiration time interval of the caches 122 and/or 123. The capacity threshold and/or expiration time interval may be defined as default values or otherwise set by users of the system 100.

In some examples, the client 104 is configured to use the locally cached catalog file copy 124 and index copies 126-128 to identify locations of data to be read from the file system 110 prior to accessing the server 102. For instance, to read a set of data from a particular location address in the file system 110, the client 104 may search the catalog file copy 124 to identify the sorted data table or tables on which the desired set of data is stored and then search the index copies 126-128 associated with the identified sorted data table or tables for offset locations of the set of data within the identified tables. The client 104 may then use the identified tables and associated offset locations to request the desired set of data from the file system 110 on the server 102. Such use of the catalog file copy 124 and/or index copies 126-128 may reduce the relative resource costs associated with performing the search operations and read operations in the file system 110 on the server 102. Additionally, or alternatively, read data instructions may result in first searching the data caches 122 and/or 123 for a locally cached copy of the desired data prior to identifying a location of the data in the file system 110 using the catalog file copy 124 and index copies 126-128.

Further, the client 104 may be configured to maintain up-to-date versions of the catalog file copy 124 and index copies 126-128 by retrieving or otherwise receiving catalog file data and index data from the server 102 on a periodic basis and/or when triggered by occurrence of defined events. In some examples, the client 104 may retrieve or otherwise receive updated versions of the catalog file 112 from the server 102 and, based on the metadata structure defined by the most recently received catalog file version, generate up-to-date index copies 126-128. However, other methods for maintaining up-to-date versions of the catalog file 112 are operable with the present disclosure.

In some examples, the system may be configured to provide additional features, such as compression, checksum verification, encryption, or the like. For instance, the client 104 may be configured to compress data in a manner understood by a person of ordinary skill in the art prior to sending it to be written in the LSM tree file system 110. Such compression may require that the associated indexes (e.g., index 118, etc.) be configured to account for the compressed size.

Alternatively, or additionally, the LSM tree file system 110 may be configured to include checksums for the data being stored in the sorted data tables 114-116. Such checksums may be generated per block or based on another data unit size and the checksums may be stored in the index 118 of the associated sorted data table 114. Later, when data is ready by the client 104, the checksum in the index 118 may be verified according to methods understood by a person of ordinary skill in the art.

In further examples, the system 100 may be configured to provide encryption of data being stored on the LSM tree file system 110. For instance, the client 104 may be configured to encrypt data according to any known technique prior to writing the data to the LSM tree file system 110 and to decrypt the data according to the associated decryption technique after it is retrieved from the LSM tree file system 110. Because the file system 110 and object storage platform 108 are largely agnostic regarding the arrangement of the data therein, so long as the client 104 is configured to perform the encryption and decryption operations, the server-side operations may be performed in the same manner as described herein.

Further details regarding operations for reading data from and writing data to the file system 110 from the client 104 are described below with respect to the figures.

Figure 2A:
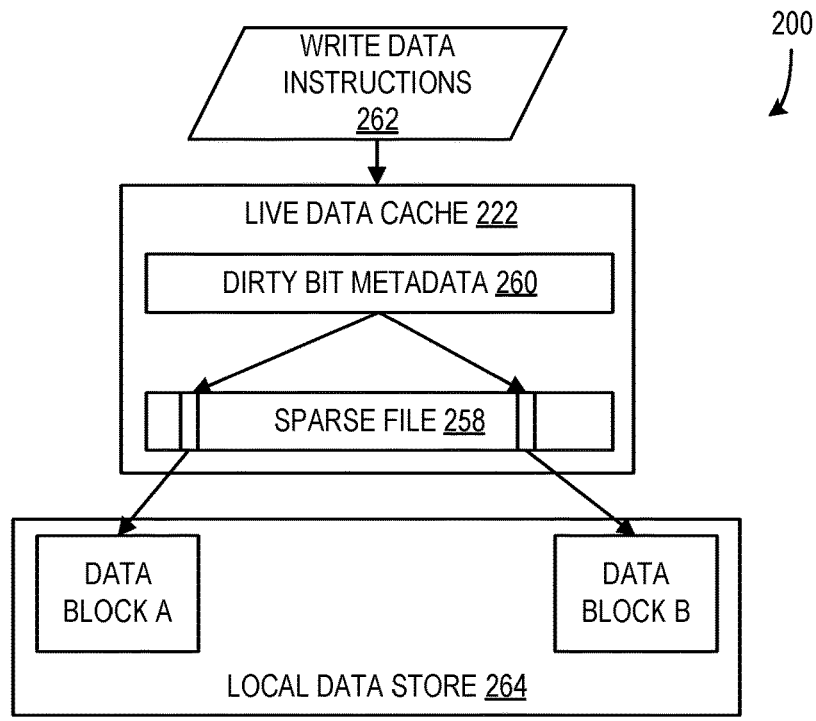
FIGS. 2A-B are exemplary block diagrams illustrating the configuration of a data caches and an associated data staging process for writing data to an LSM tree file system according to an embodiment.
Figure 2B:
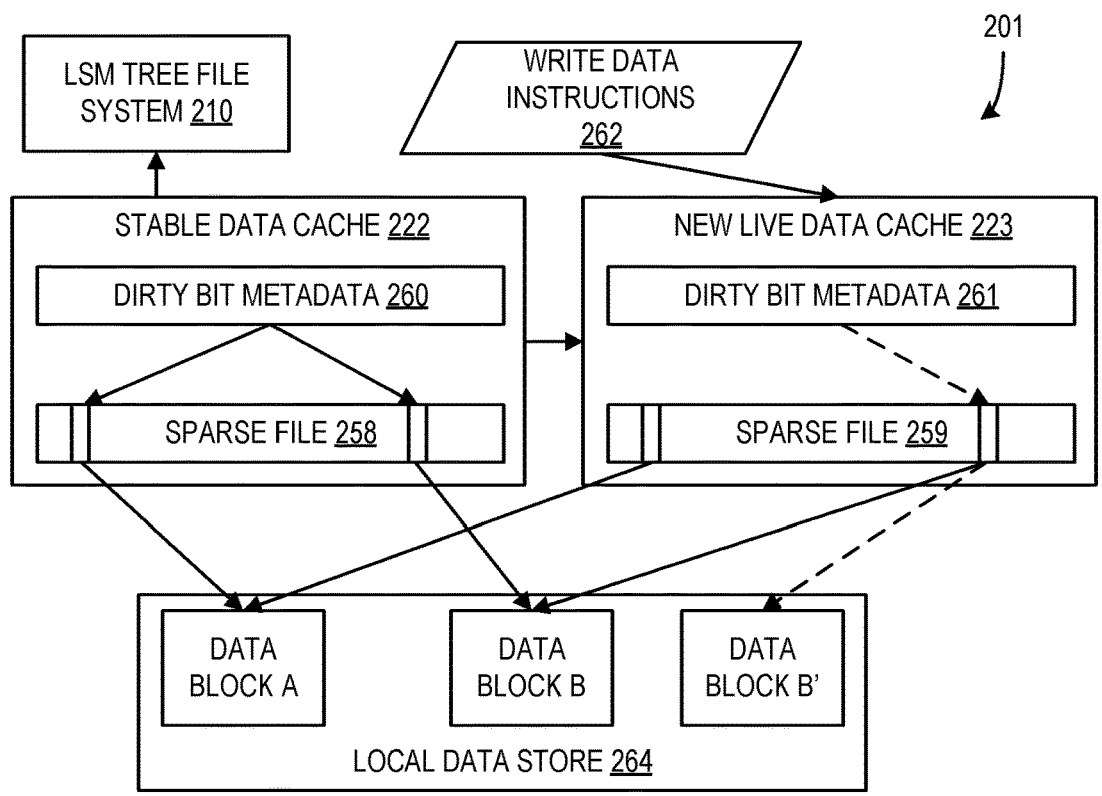

FIGS. 2A-B are exemplary block diagrams illustrating the configuration of data caches 222 and 223 and an associated data staging process for writing data to an LSM tree file system 210 according to an embodiment. In FIG. 2A, the data cache 222 is initially a live data cache 222 and the data cache 223 has not been created. The initial live data cache 222 includes a sparse file 258 for tracking changes made to data and associated "dirty bit" metadata 260. The changes tracked in the initial live data cache 222 may be based on I/O operations associated with write data instructions 262, which may be local data traffic of a client device (e.g., client 104). In some examples, the sparse file 258 includes pointers or references to data blocks (e.g., data block A, data block B, etc.) on a local data store 264. It should be understood that the local data store 264 may be part of or otherwise associated with the live data cache 222 and may be configured as a data store as would be understood by a person of ordinary skill in the art without departing from the description herein.

In some examples, the sparse file 258 is configured to operate according to known sparse file principles. For instance, the sparse file 258 may include data entries associated with subsets of data of a file system, including addresses and/or data block offsets of each data subset. Rather than including entries for all data blocks of the associated file system, portions of the file system that are empty and/or have not been changed may be represented within the sparse file 258 by metadata indicating ranges of empty and/or unchanged data blocks, thereby substantially reducing the storage space required by the sparse file 258 to represent the file system (e.g., if data blocks at offsets 101 to 200 remain unchanged, rather than including 100 data blocks representing the data blocks at offsets 101 to 200, metadata may be included in the sparse file indicating the range of data blocks from 101 to 200 are unchanged). The sparse file 258 may be structured for use with 4 KB data blocks of the structure of the LSM tree file system, such that the offsets in the sparse file 258 align with offsets of the LSM tree file system. As a result, accessing data by offset in the sparse file 258 directly translates to accessing data by offset in the file system.

Additionally, the sparse file 258 may be configured to include pointers or references to data blocks (e.g., data blocks A, B, etc.) in an associated local data store 264 rather than directly storing the associated data. This additional level of abstraction increases the flexibility of the data cache 222 and enables efficient cloning of the data cache 222 for use in staging data for writing to the LSM tree file system 210 as described herein.

The dirty bit metadata 260 includes a bit for each block represented in the sparse file 258 and/or the associated file system. Each bit may be set (e.g., changed from '0' to '1', etc.) when the associated data block is changed (e.g., based on the write data instructions 262, etc.). This metadata may be used during the described staging process to determine which data blocks should be written to the LSM tree file system 210. It should be understood that, in alternative embodiments, the dirty bit metadata 260 may include bits associated with other types or sizes of data structures without departing from the description herein.

The write data instructions 262 may include any I/O operations of the associated client device (e.g., client 104) that interact with the file system 210 via the live data caches 222 and 223 as described herein. For instance, the write data instructions 262 may include instructions from an operating system, software applications, and/or users of the client device. Additionally, or alternatively, write data instructions 262 may include instructions received via a network connection or the like. The initial live data cache 222 is configured to receive write data instructions 262 and make changes to the sparse file 258 and the local data store 264 based on the write data instructions. For instance, if the write data instruction indicates a new data block should be written at a block address, the live data cache 222 may cause the new data block to be written in the local data store 264 and a reference to the new data block to be included in the sparse file 258 at a location associated with the target block address. Further, the dirty bit associated with the target block address in the dirty bit metadata 260 may be set, representing that the block at the target block address has been changed.

In some examples, the live data cache 222 may also be accessed in response to read data instructions. For instance, if a client device (e.g., client 104) associated with the live data cache 222 receives an instruction to read the data of a data block (e.g., data block A, B, etc.), the client device may first search the live data cache 222 to determine if the data is present locally in the cache, local data store, or the like. If the sparse file 258 includes a reference to a data block at a location associated with the data block desired to be read, the client device may access the data block (e.g., data block A) in the local data store (e.g., local data store 264).

In FIG. 2B, two data caches 222 and 223 are illustrated. When the system is staging data in the initial live data cache 222 of FIG. 2A for writing to the LSM tree file system 210, the new live data cache 223 is created. Based on the initiation of the staging process, the initial live data cache 222 is converted to a stable data cache 222. In some examples, the conversion to the stable data cache 222 results in the write data instructions 262 to the data cache 222 being blocked or interrupted to ensure that the stable data cache 222 remains in a stable state (e.g., the data cache 222 may be renamed such that references to the previous name of the data cache 222 no longer reach the data cache 222, etc.). The new live data cache 223 is created by cloning the data of the stable data cache 222. The cloning operation includes copying the data of the sparse file 258 to the sparse file 259. In examples where the sparse files 258 and 259 contain references to data blocks in the local data store 264, the data blocks to which the sparse files refer may not be affected by the cloning operation, such that sparse files 258 and 259 refer to the same set of data blocks (e.g., the cloning operation is based on known copy-on-write or redirect-on-write principles to avoid large data copying overhead during the initial cloning).

Further, the dirty bit metadata 261 of the new live data cache 223 may be initiated with no dirty bits set. Because the dirty bit metadata indicates changed data that is to be written to the LSM tree file system 210 and that changed data is accounted for in the stable data cache 222, the new live data cache 223 is configured to track changed data going forward from its creation, hence the dirty bit metadata 261 including no dirty bits upon initiation.

As soon as the new live data cache 223 is cloned, the write data instructions 262 are redirected to the new live data cache 223. As a result, while the changed data of the stable data cache 222 is being written to the LSM tree file system 210, I/O operations of the write data instructions 262 are not interrupted, but rather they are recorded and/or processed at the new live data cache 223. In some examples, when the write data instructions 262 result in write instructions to a data block after it has been redirected to the new live data cache 223, the system may record the data change of the write instruction in the sparse file 259, set an associated dirty bit in the dirty bit metadata 261, and/or write associated data to the local data store 264. For instance, as illustrated, write data instructions 262 may cause data block B to be changed to data block B' after the instructions 262 are redirected to the new live data cache 223. The dashed lines in the figure indicate that the dirty bit associated with the data block B reference is set in the dirty bit metadata 261, and the reference to data block B is replaced or otherwise changed to a reference to a newly written data block B' in the local data store 264. As a result, the original data block B, which the stable data cache 222 still references, remains unchanged, protecting the consistency of the data of the stable data cache 222 that is to be written to the LSM tree file system 210.

It should be understood that, when the data of the stable data cache 222 is completely written to the LSM tree file system 210, the system may be configured to delete the stable data cache 222 and/or reclaim the memory and/or data space occupied by the stable data cache 222. The state of the cache system may generally revert to the illustrated configuration of FIG. 2A.

Further, it should be understood that writing the data of the stable data cache 222 to the LSM tree file system 210 is performed using known LSM tree principles (e.g., no overwriting or deleting of sorted data tables is performed due to the LSM tree "immutable write" principle, etc.). Overwriting of a data location may be achieved by appending a sorted data table to the LSM tree file system 210 that includes a new data value or values associated with the data location to be overwritten. The most recent data value or values associated with the data location may be considered to be the current contents of the data location. Deletion of data in a data location may be achieved by appending a sorted data table to the LSM tree file system 210 that includes an empty value or "null value" for the data location, forming a "tombstone" to signify that the tuple of the data location has been "unmapped" or "trimmed" from the file system.

In some examples, the data caches 222 and 223 as described herein may be implemented as a Virtual Distributed File System (VDFS) or another type of file system supporting efficient file clones without departing from the description. Further, the data caches 222 and 223 may be implemented on a virtual storage area network (vSAN) platform or other similar virtual storage platform without departing from the description. Some or all of the data of caches 222 and 223 may be stored in on-disk structures that provide persistent storage of the data in case of power failure of the associated client device or other similar issues.

Figure 3:
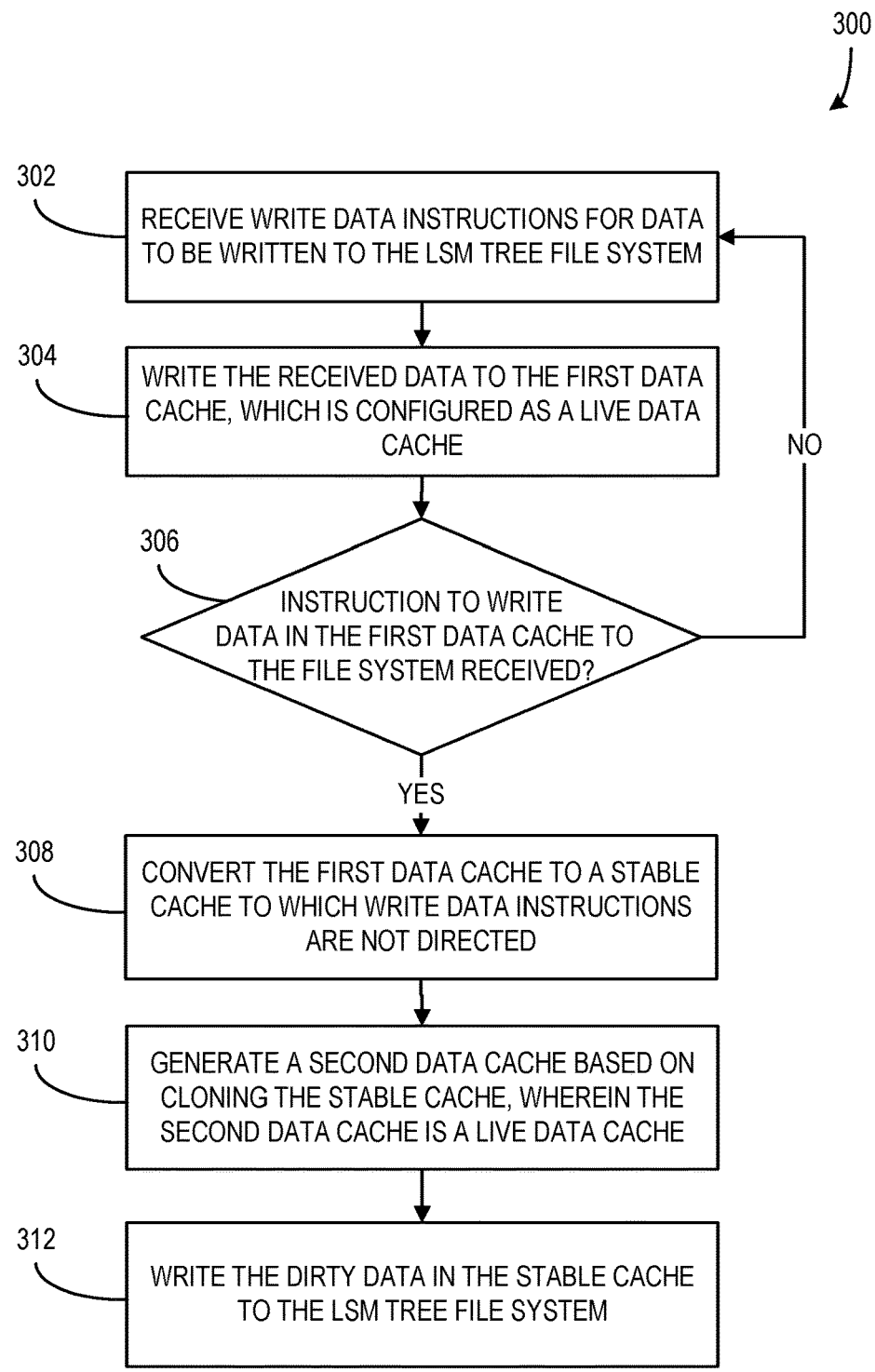
FIG. 3 is an exemplary flow chart illustrating a method of staging data and writing data to an LSM tree file system using a combination of a live data cache and a stable data cache according to an embodiment.

FIG. 3 is an exemplary flow chart 300 illustrating a method of staging data and writing data to an LSM tree file system (e.g., LSM tree file system 110) using a combination of live data cache (e.g., data cache 223) and stable data cache (e.g., data cache 222) according to an embodiment. In some examples, the method of flow chart 300 is performed by a computer system as described herein (e.g., the client 104). At 302, write data instructions for data to be written to the LSM tree file system are received. The write data instructions may be local I/O operations within the computer system and/or they may be received via a network connection with another device. The instructions may include instructions to write data in an unused data location, overwrite data in a used data location, delete data from a data location, etc. The write data instructions may include data values to be written and addresses, offsets, or other data location information (e.g., data block offset values associated with the LSM tree file system 110) associated with a data location or locations to which the data values are to be written.

At 304, the received data of the write data instructions is written to a first data cache (e.g., data cache 222), which is configured as a live data cache. In some examples, a live data cache is a cache to which write data instructions and other associated I/O operations are directed by default (e.g., the first data cache is configured to automatically receive all write data instructions by default). Writing the received data to the first data cache may include writing any data values to data blocks in an associated data store. Further, writing the data may include updating a sparse file (e.g., sparse file 258) and/or dirty bit metadata (e.g., dirty bit metadata 260) as described herein. For instance, if a write data instruction indicates that data values are to be written to a target data block that is as yet unused, writing the data to the data cache may include writing the data values to an unused data block in a data store associated with the cache, updating the sparse file of the cache to include a reference to the newly written data block associated with a target data block address of the file system, and setting the dirty bit associated with the target data block to indicate that the data block has been changed.

At 306, if instructions to write the data in the first data cache to the file system have been received, the process proceeds to 308. Alternatively, if such instructions have not been received, the process may return to 302 upon receiving more write data instructions or the like. In some examples, the instructions to write data from the first data cache to the file system may be triggered based on the quantity of data in the first data cache exceeding a defined cache threshold and/or on a defined cache time interval passing since the last time data was written from the cache to the file system. For instance, the data cache and/or associated computer system may be configured to write the data from the cache to the file system at least once every 30 minutes. Further, once the quantity of data associated with set dirty bits in the data cache exceeds a number of megabytes (MB) and/or a quantity of data blocks, etc., the instructions to write from the data cache to the file system may be triggered. Other thresholds or rules may also be configured to cause the writing of data from the cache to the file system to be triggered without departing from the description herein.

At 308, based on the instructions to write data from the cache to the file system being received, the first data cache is converted to a stable cache to which write data instructions are not directed. The conversion to a stable cache may include, for instance, renaming the first data cache such that instructions that rely on the previous name of the first data cache do not reach the newly renamed data cache. Alternatively, or additionally, a flag associated with the first data cache may be set that indicates that the cache is stable and that no further write instructions are to be processed with respect to the first data cache.

At 310, a second data cache is generated based on cloning the stable cache. This second data cache is generated and configured as a live data cache, such that any further write data instructions or associated I/O operations are directed to the second data cache by default. It should be understood that, while 308 and 310 are illustrated as being performed sequentially, in some examples, they may be performed at substantially the same time, such that there is little or no delay for incoming write data instructions during the period after the first data cache is converted to a stable cache and prior to the generation of the second data cache.

Cloning of the second data cache from the first data cache may include copying of the sparse file and/or other associated data from the first data cache to the second data cache. However, in some examples, the dirty bit metadata of the second data cache is cleared upon generation, rather than copying the dirty bit metadata from the first data cache, as described herein. Substantial overhead for copying large amounts of data during the cloning may be reduced through the use of copy-on-write principles as described herein, such that both the first data cache and second data cache reference the same data blocks in an associated data store until data of the data blocks is changed based on a write data instruction or the like.

At 312, the data (e.g., dirty data) in the stable cache is written to the LSM tree file system. Writing of the data in the stable cache to the file system may include reading the dirty bit metadata of the cache to identify the data blocks that will be written. Then the identified data blocks may be compressed or otherwise transformed into one or more sorted data tables (e.g., sorted data tables 114-116). The newly created sorted data tables may be transferred to the LSM tree file system and appended to the file system according to known LSM tree principles. It should be understood that, while the stable cache is used to write the data to the LSM tree file system, write data instructions and/or other I/O operations of the computer system may be handled in parallel at the second data cache, which is configured as the live data cache as described.

Figure 4:
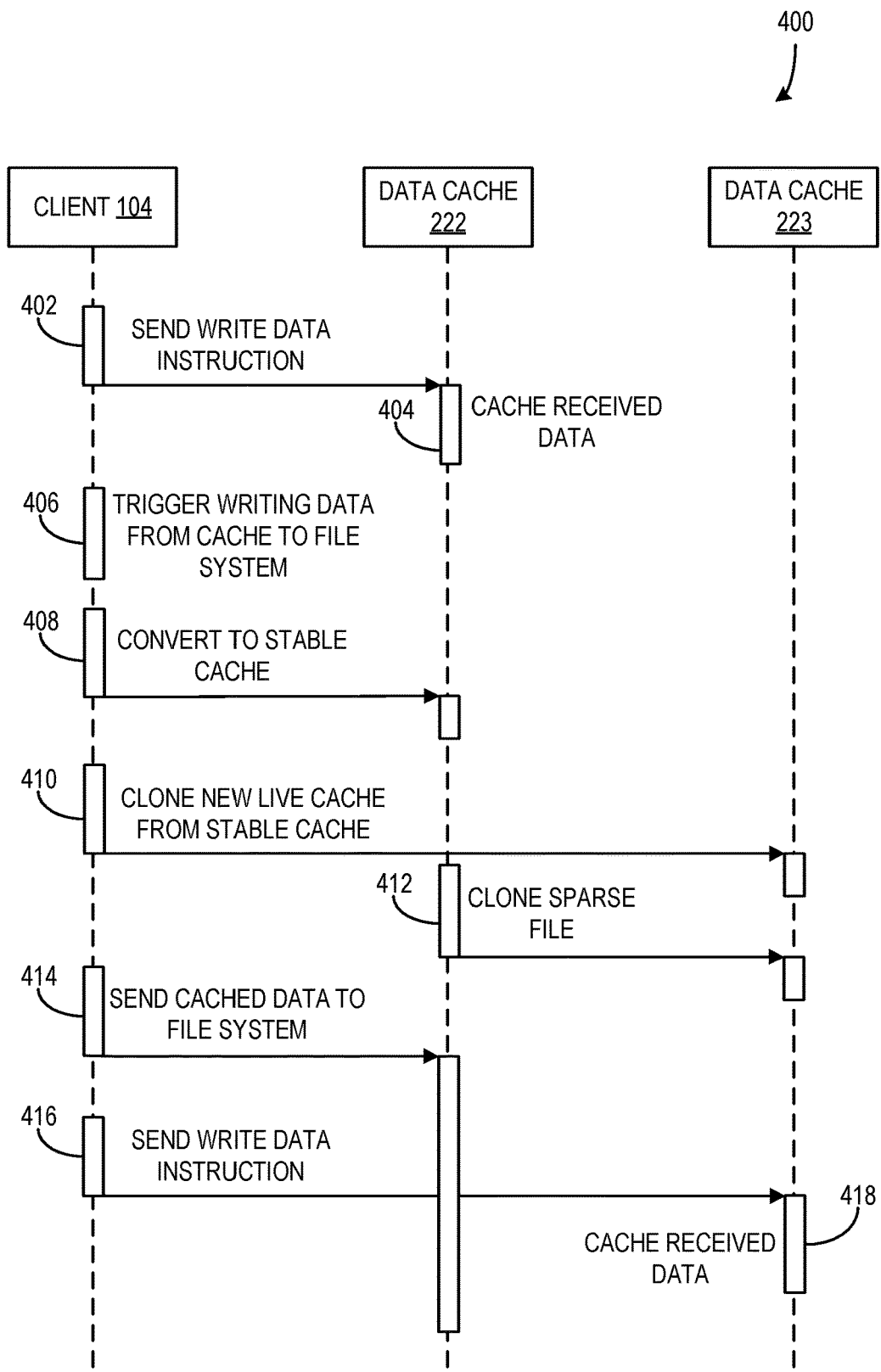
FIG. 4 is an exemplary sequence diagram illustrating a method of staging data and writing data to an LSM tree file system using a combination of a live data cache and a stable data cache according to an embodiment.

FIG. 4 is an exemplary sequence diagram 400 illustrating a method of staging data and writing data to an LSM tree file system using a combination of a live data cache and a stable data cache according to an embodiment. In some examples, the method of diagram 400 may be performed by a computing device (e.g., client 104) as described herein. At 402, the client 104 sends a write data instruction to the data cache 222 and, at 404, the data cache 222 caches data received in the write data instruction. As described above, the data cache 222 may be configured as a live data cache, such that it is the default target of write data instructions of the client 104.

Later, at 406, the client 104 triggers the process of writing data from the cache to the file system. As described above, this may be triggered based on defined rules associated with the client 104 and/or the data cache 222 (e.g., a time interval, data threshold, etc.). At 408, the client 104 converts the data cache 222 to a stable cache, such that write data instructions are no longer be targeted at the data cache 222. At 410, the client 104 clones a new live cache 223 from the stable cache 222. At 412, the cloning of the data cache 223 from the data cache 222 includes cloning or otherwise copying the sparse file of data cache 222 to data cache 223, as described herein.

Once the data cache 222 is converted to a stable cache and the data cache 223 is cloned, at 414, the client sends the cached data of data cache 222 to the file system. As illustrated, the process of sending the cached data to the file system may occupy the data cache 222 for a relatively extended period of time. However, because the cloned data cache 223 has been created, at 416, the client 104 is enabled to send a write data instruction to the data cache 223 while the data cache 222 is used to write data to the file system. At 418, the data cache 223 caches the data received from the write data instruction as described herein.

Additional Example Scenarios

Aspects of the disclosure enable various additional scenarios, such as next described.

In an example, an LSM tree file system is installed on an object storage platform. The object storage platform is installed on a server which is connected via a network to a client device. The client device includes a live data cache that is configured to cache data changes based on I/O operations of the client device locally prior to staging the data changes to the LSM tree file system via the network.

The client device performs an I/O operation based on an executing application that results in a write data instruction indicating the writing of a new file. The client device processes the write data instruction by recording the data changes associated with writing the new file to the live data cache. The data changes include writing a new data block at block offset A. The client device writes the data block to an associated data store and identifies a data location associated with block offset A in the sparse file of the live data cache. A reference to the written data block in the data store is recorded in the identified data location of the sparse file. Finally, a dirty bit associated with the identified data location of the sparse file is set to '1', indicating that that data block has been changed and needs to be recorded to the LSM tree file system at some point.

Later, the client device processes another write data instruction that indicates data should be written to a data block at block offset B. the client device writes the indicated data to another data block of the data store and records a reference to the data block in a data location of the sparse file associated with block offset B. The dirty bit associated with the block offset B is also set to '1'.

After a time interval associated with the live data cache has passed, the client device initiates a staging process for transferring the data changes in the live data cache to the LSM tree file system. The client device converts the live data cache to a stable cache, preserving the current state of the cache as a snapshot. The conversion includes diverting further I/O operations from being recorded in the converted stable cache. To continue handling I/O operations, the client device generates a second live data cache as a clone of the stable cache. The cloning operation includes copying the contents of the sparse file of the stable cache, including references to the data store shared between the caches and the dirty bit metadata of the sparse files. Further, the dirty bit metadata of the second live data cache is zeroed out or otherwise cleared. The client device redirects the I/O traffic to the newly generated second live data cache to continue recording any data changes therein.

Once the second live data cache is created, the client device begins staging the data in the stable cache and transferring it to the LSM tree file system. The client device identifies all the data blocks for which dirty bits are set in the sparse file of the stable cache. The identified data blocks are then accessed based on the associated references in the sparse file, which reference the data blocks as recorded in the associated data store. The client device transforms the data blocks to be written into one or more sorted data tables, such that the data can be efficiently inserted into the LSM tree file system. The client device proceeds to transfer the sorted data tables to the LSM tree file system via the network. The client device accesses an API that is exposed for accessing the LSM tree file system and inserts the sorted data tables into the file system.

Concurrently with the data in the stable cache being transferred, a write data instruction is processed by the client device with respect to the second live data cache. The instruction indicates that the data of the data block at block offset B is to be changed. The client device accesses the sparse file of the second live data cache to determine that the data block of block offset B is already cached by the live data cache and, therefore, the stable cache. The client device copies the data block to a new data location in the data store and incorporates the data change associated with the write data instruction therein. Then, the data location of the sparse file of the second live data cache associated with the block offset B is updated with a reference to the newly copied data block in the data store. Finally, the dirty bit associated with the block offset B in the sparse file is set to '1' to indicate that that data block has once again been changed.

When the client device completes the staging process of the data of the stable cache to the LSM tree file system, the client device deletes or otherwise releases the stable cache, such that only the second live data cache remains.

Exemplary Operating Environment

Figure 5:
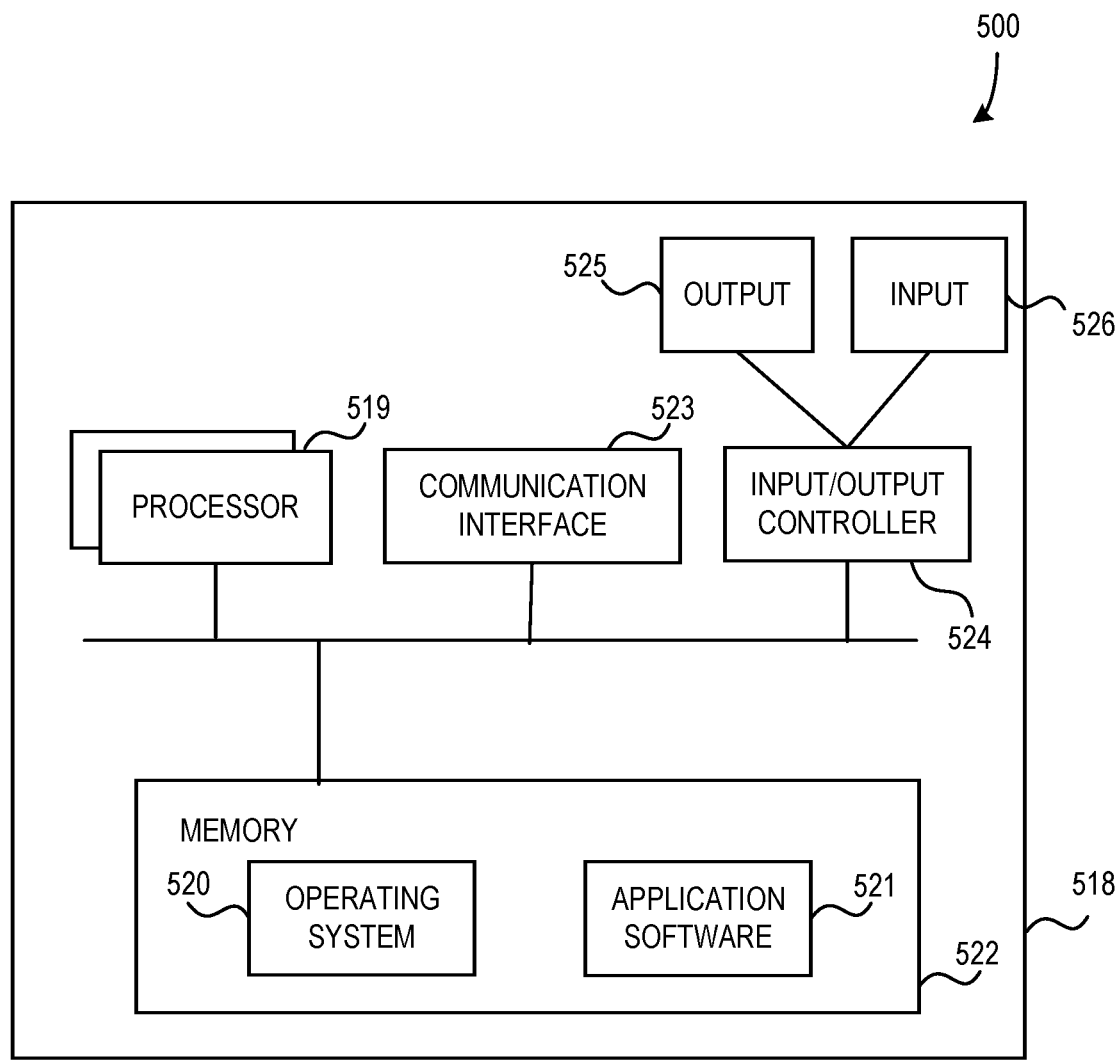
FIG. 5 illustrates a computing apparatus according to an embodiment as a functional block diagram.

The present disclosure is operable with a computing apparatus according to an embodiment as a functional block diagram 500 in FIG. 5. In an embodiment, components of a computing apparatus 518 may be implemented as a part of an electronic device according to one or more embodiments described in this specification. The computing apparatus 518 comprises one or more processors 519 which may be microprocessors, controllers or any other suitable type of processors for processing computer executable instructions to control the operation of the electronic device. Alternatively, or in addition, the processor 519 is any technology capable of executing logic or instructions, such as a hard-coded machine. Platform software comprising an operating system 520 or any other suitable platform software may be provided on the apparatus 518 to enable application software 521 to be executed on the device. According to an embodiment, managing and using a combination of live data cache and stable data cache to write data to an LSM tree file system as described herein may be accomplished by software, hardware, and/or firmware.

Computer executable instructions may be provided using any computer-readable media that are accessible by the computing apparatus 518. Computer-readable media may include, for example, computer storage media such as a memory 522 and communications media. Computer storage media, such as a memory 522, include volatile and non-volatile, removable and non-removable media implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, CD-ROM, digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 522) is shown within the computing apparatus 518, it will be appreciated by a person skilled in the art, that the storage may be distributed or located remotely and accessed via a network or other communication link (e.g. using a communication interface 523).

The computing apparatus 518 may comprise an input/output controller 524 configured to output information to one or more output devices 525, for example a display or a speaker, which may be separate from or integral to the electronic device. The input/output controller 524 may also be configured to receive and process an input from one or more input devices 526, for example, a keyboard, a microphone or a touchpad. In one embodiment, the output device 525 may also act as the input device. An example of such a device may be a touch sensitive display. The input/output controller 524 may also output data to devices other than the output device, e.g. a locally connected printing device. In some embodiments, a user may provide input to the input device(s) 526 and/or receive output from the output device(s) 525.

The functionality described herein can be performed, at least in part, by one or more hardware logic components. According to an embodiment, the computing apparatus 518 is configured by the program code when executed by the processor 519 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example computerized method for writing data to an LSM tree file system on an object storage platform comprises: receiving, by a processor, write data instructions indicating data for writing to the LSM tree file system; based on the received write data instructions, writing, by the processor, the data to a first data cache, wherein the first data cache is configured as a live data cache to which write data instructions are directed; based on an instruction to transfer data in the live data cache to the LSM tree file system, converting, by the processor, the first data cache to a stable cache to which write data instructions are not directed; generating, by the processor, a second data cache based on cloning the first data cache, wherein the second data cache is configured as a live data cache to which write data instructions are directed; and writing, by the processor, the data in the first data cache to the LSM tree file system, whereby writing the data in the first data cache to the LSM tree file system is performed in parallel with the second data cache receiving write data instructions.

An example computer system comprises: a processor and a non-transitory computer readable medium having stored thereon program code for writing data to an LSM tree file system on an object storage platform, the program code causing the processor to receive write data instructions indicating data for writing to the LSM tree file system; based on the received write data instructions, write the data to a first data cache, wherein the first data cache is configured as a live data cache to which write data instructions are directed; based on an instruction to transfer data in the live data cache to the LSM tree file system, convert the first data cache to a stable cache to which write data instructions are not directed; generate a second data cache based on cloning the first data cache, wherein the second data cache is configured as a live data cache to which write data instructions are directed; and write the data in the first data cache to the LSM tree file system, whereby writing the data in the first data cache to the LSM tree file system is performed in parallel with the second data cache receiving write data instructions.

An exemplary non-transitory computer readable storage medium has stored thereon program code executable by a first computer system at a first site, the program code embodies a method comprising: receiving write data instructions indicating data for writing to an LSM tree file system; based on the received write data instructions, writing the data to a first data cache, wherein the first data cache is configured as a live data cache to which write data instructions are directed; based on an instruction to transfer data in the live data cache to the LSM tree file system, converting the first data cache to a stable cache to which write data instructions are not directed; generating a second data cache based on cloning the first data cache, wherein the second data cache is configured as a live data cache to which write data instructions are directed; and writing the data in the first data cache to the LSM tree file system, whereby writing the data in the first data cache to the LSM tree file system is performed in parallel with the second data cache receiving write data instructions.

Alternatively, or in addition to the other examples described herein, examples include any combination of the following:

- wherein the first data cache and the second data cache are installed on a local device and the LSM tree file system is installed on a device connected to the local device by a network.
- wherein the first data cache and second data cache include dirty bits associated with data blocks, the dirty bits indicating that associated data blocks are changed in an associated data cache; and
- wherein generating the second data cache based on cloning the first data cache includes clearing all dirty bits of the second data cache.
- wherein the first data cache and second data cache include respective sparse files representing a set of data blocks of the LSM tree file system, the respective sparse files including references to cached data blocks;
- wherein generating the second data cache based on cloning the first data cache includes copying cached data block references of a sparse file of the first data cache to the second data cache, whereby a sparse file of the second data cache includes references to the same cached data blocks as the sparse file of the first data cache.
- further comprising: receiving a write data instruction indicating a data change to be made to a target cached data block, wherein the write data instruction is directed to the second data cache; writing a new data block based on the write data instruction, wherein the new data block is a copy of the target cached data block including the data change; and replacing, in the sparse file of the second data cache, a reference to the target cached data block with a reference to the new data block.
- wherein the instruction to transfer data in the live data cache to the LSM tree file system is based on at least one of an expiration of a data cache interval and a data cache capacity being exceeded by the first data cache.
- further comprising based on completion of writing the data in the first data cache to the LSM tree file system, deleting the first data cache.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for receiving write data instructions indicating data for writing to the LSM tree file system; means for, based on the received write data instructions, writing, the data to a first data cache, wherein the first data cache is configured as a live data cache to which write data instructions are directed; means for, based on an instruction to transfer data in the live data cache to the LSM tree file system, converting the first data cache to a stable cache to which write data instructions are not directed; means for generating a second data cache based on cloning the first data cache, wherein the second data cache is configured as a live data cache to which write data instructions are directed; and means for writing the data in the first data cache to the LSM tree file system, whereby writing the data in the first data cache to the LSM tree file system is performed in parallel with the second data cache receiving write data instructions. The illustrated one or more processors 519 together with the computer program code stored in memory 522 constitute exemplary processing means for caching data in live data caches, converting to stable caches and cloning new live data caches, and writing data from the caches to the LSM tree file system as described herein.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computerized method for writing data to a log-structured merge (LSM) tree file system on an object storage platform, the method comprising:
   receiving, by a processor, write data instructions indicating data for writing to the LSM tree file system;
   based on the received write data instructions, writing, by the processor, the data to a first data cache, wherein the first data cache is configured as a live data cache to which write data instructions are directed and a second data cache has not been generated; and
   based on an instruction to transfer data in the live data cache to the LSM tree file system:
      converting, by the processor, the first data cache from the live data cache to a stable cache to which write data instructions are not directed;
      generating, by the processor, the second data cache based on cloning the stable cache, wherein the second data cache is configured as a live data cache to which write data instructions are directed; and
      writing, by the processor, the data in the stable cache to the LSM tree file system in parallel with the second data cache receiving write data instructions.

2. The computerized method of claim 1, wherein the stable cache and the second data cache are installed on a client device and the LSM tree file system is installed on a server device connected to the client device by a network.

3. The computerized method of claim 1, wherein the stable cache and second data cache include dirty bits associated with data blocks, the dirty bits indicating that associated data blocks are changed in an associated data cache; and
   wherein generating the second data cache based on cloning the stable cache includes clearing all dirty bits of the second data cache.

4. The computerized method of claim 1, wherein the stable cache and second data cache include respective sparse files representing a set of data blocks of the LSM tree file system, the respective sparse files including references to cached data blocks; and
   wherein generating the second data cache based on cloning the stable cache includes copying cached data block references of a sparse file of the stable cache to the second data cache, whereby a sparse file of the second data cache includes references to the same cached data blocks as the sparse file of the stable cache.

5. The computerized method of claim 4, further comprising:
   receiving a write data instruction indicating a data change to be made to a target cached data block, wherein the write data instruction is directed to the second data cache;
   writing a new data block based on the write data instruction, wherein the new data block is a copy of the target cached data block including the data change; and
   replacing, in the sparse file of the second data cache, a reference to the target cached data block with a reference to the new data block.

6. The computerized method of claim 1, wherein the instruction to transfer data in the live data cache to the LSM tree file system is based on at least one of an expiration of a data cache interval and a data cache capacity being exceeded by the first data cache.

7. The computerized method of claim 1, wherein converting the first data cache from the live data cache to the stable cache comprises one or more of: renaming the first data cache and setting a flag associated with the first data cache indicating that the first data cache is stable, the method further comprising:
   based on completion of writing the data in the stable cache to the LSM tree file system, deleting the stable cache.

8. A computer system comprising:
   a processor;
   a non-transitory computer readable medium having stored thereon program code for writing data to a log-structured merge (LSM) tree file system on an object storage platform, the program code causing the processor to:
   receive write data instructions indicating data for writing to the LSM tree file system;
   based on the received write data instructions, write the data to a first data cache, wherein the first data cache is configured as a live data cache to which write data instructions are directed;
   based on an instruction to transfer data in the live data cache to the LSM tree file system, convert the first data cache from the live data cache to a stable cache to which write data instructions are not directed;
   generate a second data cache based on cloning the stable cache, wherein the second data cache is configured as a live data cache to which write data instructions are directed; and
   write the data in the stable cache to the LSM tree file system, whereby writing the data in the stable cache to the LSM tree file system is performed in parallel with the second data cache receiving write data instructions.

9. The computer system of claim 8, wherein the stable cache and the second data cache are installed on a client device and the LSM tree file system is installed on a server device connected to the client device by a network.

10. The computer system of claim 8, wherein the stable cache and second data cache include dirty bits associated with data blocks, the dirty bits indicating that associated data blocks are changed in an associated data cache; and
wherein generating the second data cache based on cloning the stable cache includes clearing all dirty bits of the second data cache.

11. The computer system of claim 8, wherein the stable cache and second data cache include respective sparse files representing a set of data blocks of the LSM tree file system, the respective sparse files including references to cached data blocks; and
wherein generating the second data cache based on cloning the stable cache includes copying cached data block references of a sparse file of the stable cache to the second data cache, whereby a sparse file of the second data cache includes references to the same cached data blocks as the sparse file of the stable cache.

12. The computer system of claim 11, the program code further causing the processor to:
receive a write data instruction indicating a data change to be made to a target cached data block, wherein the write data instruction is directed to the second data cache;
write a new data block based on the write data instruction, wherein the new data block is a copy of the target cached data block including the data change; and
replace, in the sparse file of the second data cache, a reference to the target cached data block with a reference to the new data block.

13. The computer system of claim 8, wherein the instruction to transfer data in the live data cache to the LSM tree file system is based on at least one of an expiration of a data cache interval and a data cache capacity being exceeded by the first data cache.

14. The computer system of claim 8, the program code further causing the processor to:
based on completion of writing the data in the stable cache to the LSM tree file system, deleting the stable cache.

15. A non-transitory computer readable storage medium having stored thereon program code executable by a first computer system at a first site, the program code embodying a method comprising:
receiving write data instructions indicating data for writing to a log-structured merge (LSM) tree file system;
based on the received write data instructions, writing the data to a first data cache, wherein the first data cache is configured as a live data cache to which write data instructions are directed;
based on an instruction to transfer data in the live data cache to the LSM tree file system, converting the first data cache from the live data cache to a stable cache to which write data instructions are not directed;
generating a second data cache based on cloning the stable cache, wherein the second data cache is configured as a live data cache to which write data instructions are directed; and
writing the data in the first data cache to the LSM tree file system, whereby writing the data in the stable cache to the LSM tree file system is performed in parallel with the second data cache receiving write data instructions.

16. The non-transitory computer readable storage medium of claim 15, wherein the stable cache and the second data cache are installed on a client device and the LSM tree file system is installed on a server device connected to the client device by a network.

17. The non-transitory computer readable storage medium of claim 15, wherein the stable cache and second data cache include dirty bits associated with data blocks, the dirty bits indicating that associated data blocks are changed in an associated data cache; and
wherein generating the second data cache based on cloning the stable cache includes clearing all dirty bits of the second data cache.

18. The non-transitory computer readable storage medium of claim 15, wherein the stable cache and second data cache include respective sparse files representing a set of data blocks of the LSM tree file system, the respective sparse files including references to cached data blocks; and
wherein generating the second data cache based on cloning the stable cache includes copying cached data block references of a sparse file of the stable cache to the second data cache, whereby a sparse file of the second data cache includes references to the same cached data blocks as the sparse file of the stable cache.

19. The non-transitory computer readable storage medium of claim 18, the program code embodying a method further comprising:
receiving a write data instruction indicating a data change to be made to a target cached data block, wherein the write data instruction is directed to the second data cache;
writing a new data block based on the write data instruction, wherein the new data block is a copy of the target cached data block including the data change; and
replacing, in the sparse file of the second data cache, a reference to the target cached data block with a reference to the new data block.

20. The non-transitory computer readable storage medium of claim 15, wherein writing the data in the stable cache to the LSM tree file system includes transforming data in the stable cache into sorted data tables and appending the sorted data tables to the LSM tree file system.

* * * * *